United States Patent [19]

Cornelius et al.

[11] Patent Number: 5,100,449
[45] Date of Patent: Mar. 31, 1992

[54] METHOD OF FORMING GLASS ARTICLES

[75] Inventors: Lauren K. Cornelius, Painted Post; Paul A. Tick, Corning, both of N.Y.

[73] Assignee: Corning Incorporated, Corning, N.Y.

[21] Appl. No.: 568,229

[22] Filed: Aug. 16, 1990

[51] Int. Cl.$^5$ .................... C03B 37/025; C03B 18/02
[52] U.S. Cl. .......................... 65/2; 65/3.11; 65/13; 65/90; 65/99.2; 65/182.3; 65/193; 65/182.1
[58] Field of Search ............... 65/90, 2, 3.11, 99.2, 65/182.1, 182.3, 13, 193, 3.13

[56] References Cited

U.S. PATENT DOCUMENTS

| | | | |
|---|---|---|---|
| 3,193,365 | 7/1965 | Plumat | 65/90 X |
| 3,330,636 | 7/1967 | Oxley et al. | 65/90 |
| 3,336,126 | 8/1967 | Pilkington | 65/99.2 X |
| 3,353,940 | 11/1967 | Dolf | 65/99.2 X |
| 3,726,656 | 4/1973 | Reid et al. | 65/3.13 |
| 3,736,117 | 5/1973 | Dunipace et al. | 65/90 X |
| 4,040,807 | 8/1977 | Midwinter et al. | 65/3.13 |
| 4,061,484 | 12/1977 | Aulich et al. | 65/3.11 X |
| 4,304,582 | 12/1981 | Aussennegg et al. | 65/13 |
| 4,801,321 | 1/1989 | Pita et al. | 65/99.2 X |
| 4,898,603 | 2/1990 | Hutta | 65/3.13 |

Primary Examiner—Robert L. Lindsay
Attorney, Agent, or Firm—William J. Simmons, Jr.

[57] ABSTRACT

Disclosed is a method and apparatus for drawing an elongated glass article such as a fiber optic device. The article is drawn upwardly from a source through the surface of a quantity of molten metal having a vertical temperature gradient. The source can be an elongated solid glass preform that is vertically positioned within the molten metal such that the temperature of that portion of the molten metal adjacent the upper end region is sufficiently high to heat that region to drawing temperature. The upper end region is pulled to form a tapered root, continued pulling resulting in the formation of an elongated article from the small diameter root end. The relative position of the root is maintained with respect to the surface of the molten metal during the drawing operation. Alternatively, the glass can be drawn from an orifice located within the molten metal.

The apparatus includes container means for supporting the molten metal, and external or internal means for heating and/or cooling portions of the molten metal. The container can also be provided with baffle means for dividing the container into a plurality of chambers.

28 Claims, 2 Drawing Sheets

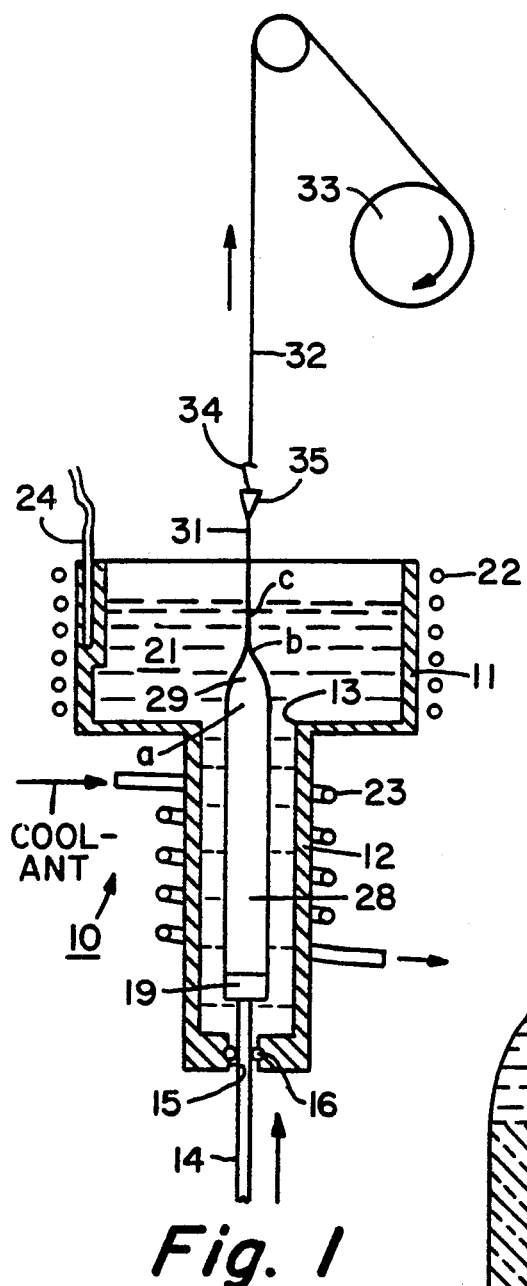
Fig. 1
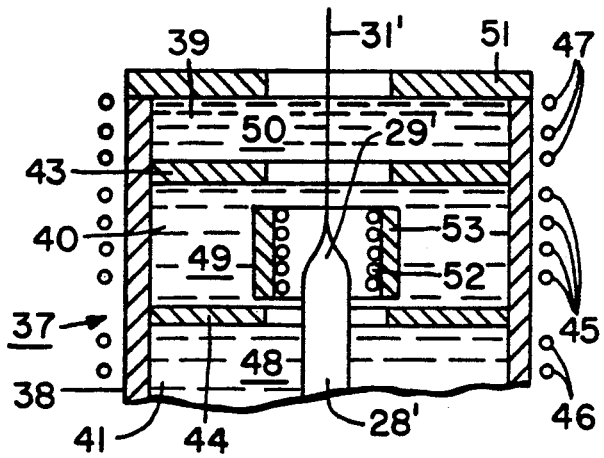
Fig. 3
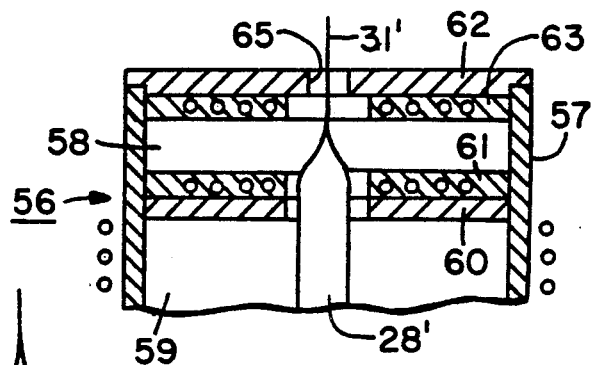
Fig. 4
Fig. 2
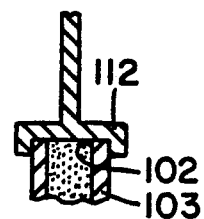
Fig. 9
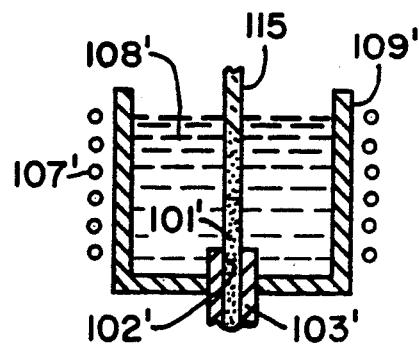
Fig. 10

METHOD OF FORMING GLASS ARTICLES

BACKGROUND OF THE INVENTION

The present invention relates to forming glass articles, and more particularly to a method of drawing glass fibers, sheets, ribbons or the like from a preform or source of glass such as an orifice.

Certain glasses such as halides, chalcogenides, oxyhalides, lead silicates, phosphates, borates and the like, which exhibit narrow working ranges, are difficult to form into fibers and thin sheets. Many of these glasses also exhibit low melting point temperatures. Some of these glasses readily devitrify, thereby requiring short residence time at elevated temperature to prevent devitrification. Glasses having narrow working ranges are exemplified by those taught in U.S. Pat. Nos. 4,314,031, 4,142,986, 4,405,724, 4,537,864, 4,668,641 and 4,752,593.

Such glasses have generated considerable interest in optical applications such as fibers, lasers and the like. Fluoride glasses, for example, are attractive candidates for transmission optical fibers, because of their low intrinsic scattering loss properties; fluoride glasses can also function as host materials for lasing dopants.

It has been difficult to draw components such as transmission optical fibers, fiber lasers and the like from preforms or melts of narrow working range glasses. Very precise temperature control is required in the fiber drawing apparatus. Radiation is not an effective heat transfer mechanism at the low draw temperatures of some of these glasses. Certain of the above-mentioned glasses devitrify if residence time at elevated temperature is too long.

When attempts have been made to draw narrow working range glasses by the double crucible method, control of glass flow has been a problem because of the sensitivity of viscosity on temperature.

In preform drawing apparatus, very sharp vertical temperature gradient is required between the root portion of the preform, which is held at draw temperature $T_d$, and the adjacent portion, which is at the glass transition temperature $T_g$. For example, in a tin fluorophosphate glass, the temperature difference between $T_g$, where viscosity is about $10^{13}$ poise, and $T_d$, where viscosity is about $10^6$ poise is about 50° to 75° C. If the drawing temperature is too high, the preform root melts and runs from the furnace; if it is too low, the fiber breaks. The magnitude of this allowable temperature interval where fiber drawing can occur may be only a few degrees.

SUMMARY OF THE INVENTION

It is therefore an object of the present invention to provide a method of drawing elongated glass articles from glass having a narrow range of working temperatures.

In accordance with the present invention, an elongated glass article is drawn upwardly from a source through the surface of a quantity of molten metal having a vertical temperature gradient. Since the density of the molten metal is greater than that of the glass source, the initially formed portion of the article is buoyed by the molten metal, thereby preventing the low viscosity glass source from slumping or deforming. Moreover, the hydrostatic force exerted by the molten metal facilitates the root formation process, and it can help reduce fiber out-of-roundness. The drawn article can have a circular cross-section; for example, it can be an optical fiber, laser or the like having an axial core glass region surrounded by a cladding glass region. Articles such as sheets, ribbons or the like having oblong cross-sections can also be produced.

The glass source can be an elongated solid glass preform having upper and lower end regions. The preform is vertically positioned within the molten metal such that the temperature of that portion of the molten metal adjacent the upper end region is sufficiently high to heat that region to drawing temperature. The upper end region is pulled to form a tapered root, continued pulling resulting in the formation of an elongated article from the small diameter root end. The relative position of the root is maintained with respect to the surface of the molten metal during the drawing operation.

In a first embodiment, a solid glass preform is immersed in a container of molten metal, the difference between the temperature of the molten metal and that of the preform being sufficiently small to prevent thermally shocking the preform. The molten metal is heated in the container to provide it with a vertical temperature gradient such that the upper end region of the preform is subjected to a temperature that is higher than that of the remainder of the preform. The article is pulled from the upper end portion where the tapered root forms.

In another embodiment, a solid glass preform is vertically positioned in a container. The preform is heated to at least its annealing temperature. A quantity of molten metal is heated to a temperature at least as high as the glass annealing temperature and is then flowed into the container to cover the preform. The molten metal is heated, and the article is drawn from the root as in the first embodiment.

Alternatively, the glass can be drawn from an orifice located within the molten metal. Molten glass is delivered to the orifice at a rate sufficient to sustain the cross-sectional area of the drawn article.

Another aspect of the invention concerns apparatus for drawing the glass article. The apparatus comprises container means for supporting the molten metal, and means providing a vertical temperature gradient in the molten metal. Means in the container provides a glass source, the temperature of which is suitable for drawing an elongated article. Means above the surface of the molten metal pulls the elongated glass article upwardly through the surface. The molten metal temperature gradient can be created by external or internal means for heating and/or cooling portions of the molten metal. The container can also be provided with baffle means for dividing the container into a plurality of chambers. The apparatus may further comprise a source of molten metal, means for delivering molten metal from the source to the container, and means for controlling the flow of molten metal through the delivering means.

In that embodiment wherein the glass source comprises an elongated glass preform, means is attached to the lower end region of the preform for vertically supporting it in the container. The means for vertically supporting the preform may comprise a support extending through the bottom of the container or one which extends through the surface of the molten metal.

BRIEF DESCRIPTION OF THE DRAWINGS

FIG. 1 is a cross-sectional view of a fiber forming apparatus.

FIG. 2 is a cross-sectional view of a preform having a molten root.

FIGS. 3 and 4 are cross-sectional views illustrating the use of baffles and auxiliary heaters.

FIG. 9 is a cross-sectional view of a flow control device for use in the apparatus of FIG. 8.

FIG. 10 is a cross-sectional view of a modification of the apparatus of FIG. 8.

DESCRIPTION OF THE PREFERRED EMBODIMENTS

Figure 5:
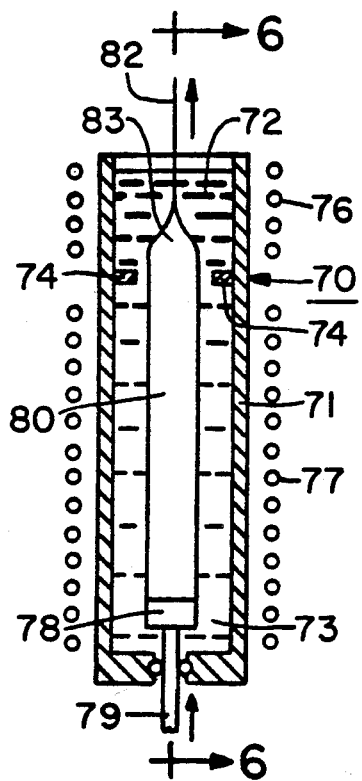
FIG. 5 is a cross-sectional view of an apparatus for drawing a glass ribbon.

The drawings are not intended to indicate scale or relative proportions of the elements shown therein.

Glass fiber forming apparatus 10 of FIG. 1 comprises upper chamber 11 and lower chamber 12, both of which are circular in cross-section. Chambers 11 and 12 can be formed of any material which does not react with liquid metal to be contained therein, i.e. stainless steel, platinum, gold, fused silica, carbon or the like. In this embodiment, chamber 11, which is larger in diameter than chamber 12, has an axial opening 13 where chamber 12 is joined. Rod 14 extends through opening 15 which is axially located in the bottom of chamber 12. Rubber O-ring 16 provides a seal between the chamber 12 and rod 14. Alternative sealing devices can be formed of soft copper, soapstone, carbon, graphite or the like. Preform support 19 is located at the end of rod 14.

Liquid metal 21 is located in the upper and lower chambers. Depending upon the particular glass being drawn, a liquid metal such as mercury, tin, bismuth, lead, gallium, indium, silver, gold, and alloys thereof could be used. The liquid metal is one which is inert with respect to the glass being formed or one which does not react adversely with the glass. The following table indicates the temperatures at which various liquid metals are useful.

| Liquid Metal | Draw Temperature (degrees C.) |
| --- | --- |
| Mercury | up to 200 |
| Tin | greater than 230 |
| Bismuth | greater than 271 |
| Lead | greater than 376 |
| Gallium | greater than room temp. |
| Indium | greater than 156 |

One or more heating means can be used to create a vertical temperature gradient along apparatus 10. Depending upon the particular liquid metal being employed, cooling means may also be used to assist in the creation of the temperature gradient.

The embodiment of FIG. 1 is suitable for drawing glass in mercury. Heating coil 22 surrounds chamber 11, and cooling coil 23 surrounds chamber 12. Temperature sensing probe 24 provides a signal that is indicative of the temperature in the region of the preform root. One or more additional temperature probes (not shown) can be provided at different vertical locations along apparatus 10. Signals from the probes can be employed in a feedback system to control the temperature of the associated regions of liquid metal 21.

An end of elongated preform 28 is attached to support 19. At the low temperatures at which mercury is used, an adhesive material such as epoxy can be used to bond the preform to support 19. Epoxy can also be employed to bond a suitable attachment means such as hook 34 to the end of the preform from which the fiber is to be drawn. Mechanical means can be employed to secure devices to preforms that are to be processed at temperatures above those suitable for bonding means such as epoxy. For example, the end regions of a preform can be slotted in order to receive a mechanical attachment device.

Optical fiber preforms are typically formed by pouring melted cladding glass into a cylindrical container which is rotated to uniformly distribute the cladding glass about the inner surface of the container wall. After the cladding glass has solidified, a rod-shaped region of core glass can be disposed within the cladding glass by pouring a melt of core glass into the cladding glass tube or by casting a rod of core glass and inserting it into the cladding glass tube to form a rod-in-tube preform.

After support 19 and hook 34 are attached to opposite ends of preform 28, rod 14 is inserted through seal 16 and attached to means for vertically moving the rod. Support 19 is located at the bottom of chamber 12, and the upper end of the preform extends into chamber 11. A wire 32 which is wound upon reel 33 is secured to hook 34. Room temperature mercury is poured into chambers 11 and 12 and over preform 28 which is also at room temperature. Heating coil 22 is activated, whereby that portion of mercury 21 within chamber 11 is heated to draw temperature $T_d$. The liquid metal provides very good conduction of heat to root 29. A coolant such as water is flowed through tubular coil 23 to cool the mercury in chamber 12.

Point a, the juncture of root 29 and the remainder of the preform, is heated to the annealing temperature $T_g$. As in conventional fiber drawing methods, the viscosity of the glass drops from about $10^{13}$ poise at point a to about $10^5$ to $10^6$ poise at point b at the tip of root 29. Point c near the surface of liquid 21 is preferably cooler than $T_d$. It is thought that since root 29 is subjected to the hydrostatic pressure of the liquid metal, temperature $T_d$ may be made sufficiently high to reduce the root viscosity to a value below ordinary draw viscosities. Perhaps the draw viscosity could be as low as about $10^4$ poise (see FIG. 2), a viscosity at which the root would be too fluid to provide the mechanical support required in a conventional draw apparatus. Hence, it may be possible to form a fiber having a circular cross-section from an out-of-round preform since surface tension would have a greater effect on the low viscosity root and the adjacent portion of fiber.

After temperature probe 24 indicates that the top portion of preform 28 has been heated to draw temperature, fiber draw is initiated by winding wire 32 on drum 33, thereby pulling hook upwardly. After preform end 35 releases from the preform and root 29 begins to form, a slow upward motion is applied to rod 14 to maintain preform 28 (and thus root 29) at its correct vertical position within the liquid metal. In an apparatus of the type shown in FIG. 1, the small diameter tip of root 29 is preferably located a few millimeters from the liquid metal surface. As discussed in conjunction with FIG. 3, a greater root tip-to-surface distance can be employed to help to anneal the drawn fiber. The fiber draw speed and the preform feed speed are then adjusted to obtain the desired fiber diameter. As the fiber is being drawn, hydrostatic forces assist in the collapse of root 29, and surface tension improves the roundness of the fiber. Fiber roundness is also enhanced because the temperature is substantially uniform at the surface of root 29 at any cross-section perpendicular to the preform axis. Since the glass is less dense than the liquid metal, the buoyancy of the glass drives it upwardly. Since the fiber is drawn upwardly, the force of gravity acts against the formation of an ideally-shaped root. The buoyancy of the glass causes the root to be mechanically stable, i.e. it prevents the root from slumping or flowing in a direction other than vertically upwardly.

Other draw initiation techniques could be employed. For example, a starting rod of suitable composition could be heated and the end thereof immersed into the liquid and brought into contact with the upper end of the heated preform. As the starting rod moves upwardly, it pulls the preform end to which it has become fused. The drawn fiber is then threaded into draw apparatus 33 which could alternatively comprise draw tractors.

More precise control of the vertical temperature gradient can be accomplished through the use of baffles and/or auxiliary heaters. Fiber forming apparatus 37 of FIG. 3 comprises a container 38 which is divided into chambers 39, 40 and 41 by baffles 43 and 44. Heating means 45 and 46 surround chambers 40 and 41, respectively. Baffle 44 divides the liquid metal into lower region 48 and upper region 49 and disrupts the circulation of liquid metal between chambers 40 and 41, thereby maintaining a relatively sharp temperature gradient between those chambers. Baffle 43 creates an additional region 50 of liquid metal, the function of which could be to provide the fiber with heat treatment such as annealing. Chamber 39 could be surrounded by appropriate temperature regulating means such as heating means 47 to impart to the drawn article a controlled cooling such as annealing. Baffles 43 and 44 could consist of an insulating material or be coated with an insulating material to reduce the conduction of heat between adjacent chambers.

Container 38 could be provided with a cover 51, the bottom surface of which is located at or above the surface of the liquid metal. The purpose of cover 51 is to prevent the escape of heat from the surface of the liquid metal.

FIG. 3 illustrates that heating means can be located within container 38. Coil 52, which is located within tubular support 53, is closely spaced from preform root 29'. Thermocouple wire can be wound along with heater coil 52 to more accurately measure the temperature of the liquid metal adjacent the root.

Fiber forming apparatus 56 of FIG. 4 comprises a container 57 in which chambers 58 and 59 are formed by baffle 60. A flat annular heater 61 can be located on the upper surface of baffle 60. Similarly, a flat annular heater 63 can be affixed to the bottom surface of cover 62. Heaters 61 and 63 can be employed in place of a heating means at the outer periphery of container 57, or they can be used in addition to a peripheral heater. The cover, baffle and heaters are provided with annular openings along the container axis to accommodate preform 28' and fiber 31'. Opening 65 in cover 62 can be smaller in diameter than the diameter of preform 28'. Cover 62 could be positioned after preform 28' is inserted into apparatus 56. Cover 62 could be split into two sections, whereby it could be installed after fiber drawing has been initiated.

Figure 6:
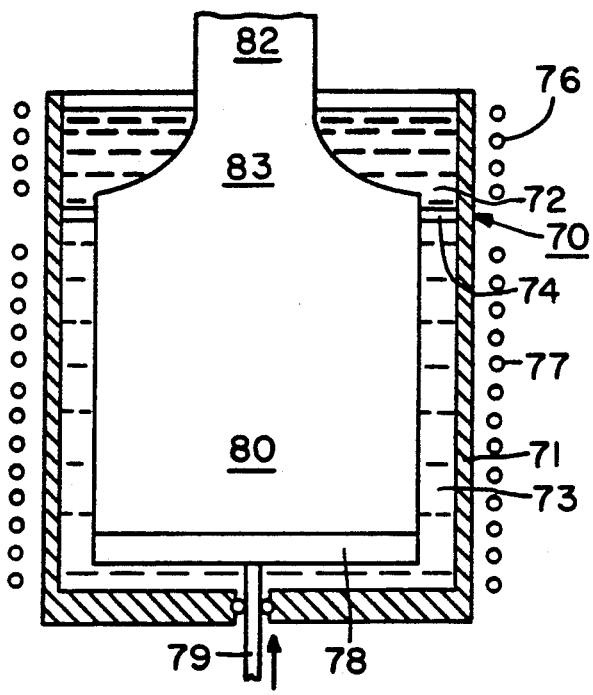
FIG. 6 is a cross-sectional view taken along lines 6—6 of FIG. 5.

The article drawn by the present method does not have to be axially symmetrical. Apparatus 70 for forming thin sheets or ribbons of glass is illustrated in FIGS. 5 and 6. Housing 71 is divided into upper chamber 72 and lower chamber 73 by baffles 74. Liquid metal within chamber 72 is heated by means 76, and that residing in chamber 73 is heated by means 77. Preform 80 is attached to support 78 which is mounted on vertically moveable rod 79.

Molten metal within chamber 72 is heated to draw temperature, and liquid metal within chamber 73 is heated to annealing temperature. Ribbon 82 is drawn by means (not shown) from root portion 83. Preform 80 is advanced upwardly at a rate sufficient to maintain root portion 83 at its proper position in chamber 72.

Figure 7:
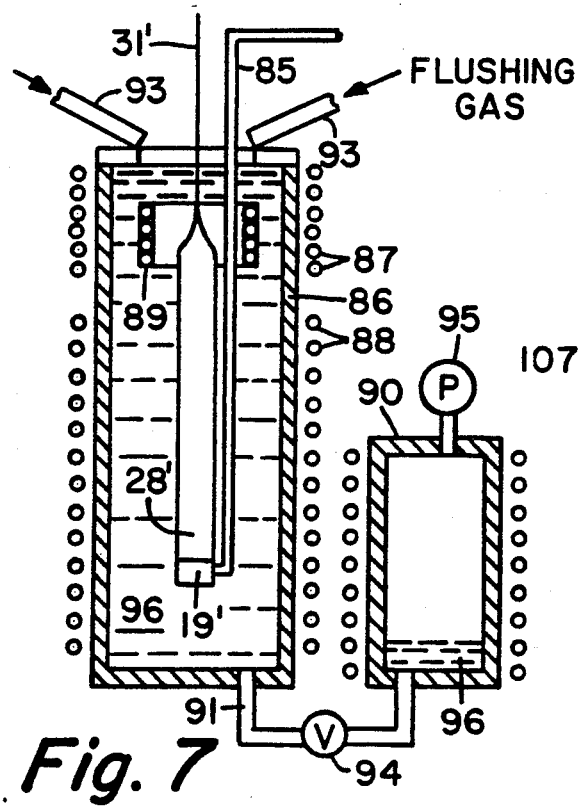
FIG. 7 is a cross-sectional view of a further fiber drawing apparatus.

In the embodiment of FIG. 7 preform 28' is attached to a support 19' which is moved vertically by a rod 85 which extends from the top of chamber 86. The chamber is heated by means 87 and 88 which extend around the circumference thereof. Heating means 89 is located in the chamber. The molten metal is initially heated to the annealing temperature of preform 28' in vessel 90, which is connected to container 86 by pipe 91 which is heated or insulated.

Preform 28' is initially lowered into chamber 86 before the liquid metal has been admitted thereto. In order to prevent oxidation of the molten metal, a flushing gas supplied through pipes 93 purges undesirable gases and vapors such as oxygen and water from chamber 86. Heating means 87 and 88 are energized to heat the preform. Valve 94 is opened and pressure from source 95 causes molten metal 96 to flow into chamber 86. At the time that the molten metal contacts the preform, the difference between the temperature of the molten metal and that of the preform is sufficiently small to prevent thermally shocking the preform. The temperature of the molten metal and preform is optionally at or above the annealing point temperature of the preform. Inert flushing gas continues to flow from pipes 93 and over the surface of the metal if metal 96 is one that readily oxidizes. The individual pipes 93 could be replaced by an annular pipe having a slot or array of orifices; such a flow device would more uniformly supply gas to the metal surface. Heater 89 is turned on to heat the top portion of the preform to draw temperature, and fiber draw is initiated as described above. While the fiber is being drawn, the preform is moved vertically with respect to the surface of the liquid metal by moving rod 85 upwardly or by holding that rod stationary and moving chamber 86 downwardly.

Figure 8:
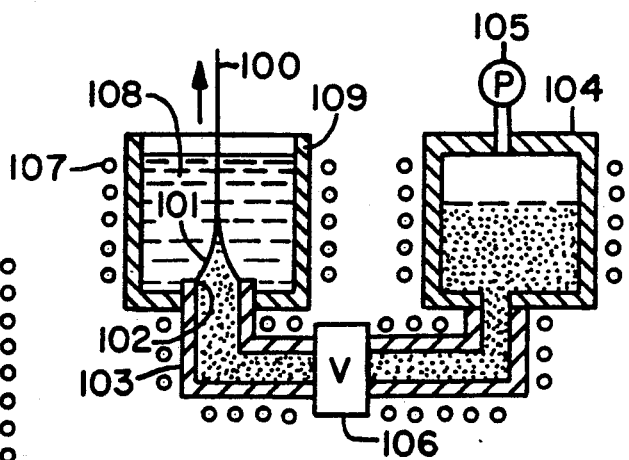
FIG. 8 is a cross-sectional view of an apparatus for drawing from a source of molten glass.

As shown in FIG. 8, the drawn article 100 can be formed from molten glass 101 issuing from an orifice 102 at the end of heated delivery tube 103. The molten glass is melted in heated vessel 104 and is delivered through tube 103 by opening a valve 106 and applying pressure from source 105. Molten metal 108 is heated in container 109 by means 107 to a temperature lower than that of the molten glass issuing from orifice 102. Whereas valve 106 is schematically represented as being in delivery tube 103, it could consist of a cover 112 that can be temporarily disposed over orifice 102 as shown in FIG. 9.

FIG. 10 shows that the glass emanating from orifice 102' can have essentially the same dimensions as the glass article 115 being drawn from liquid metal 108'. In this case the liquid metal removes a sufficient amount of heat from the molten glass so that it freezes above orifice 102'. Because of the buoyancy of the glass and the hydrostatic pressure exerted by the molten metal, the molten metal acts as a mechanical support for the glass stream until its viscosity is sufficiently high that it can support a stress.

Apparatus of the type shown in FIG. 1 was employed to draw optical fibers from an elongated, circular preform. The preform 28 was formed by pouring into a heated cylindrical container melted cladding glass comprising 50 mole % $SnF_2$, 40 mole % $\frac{1}{2}(P_2O_5)$, 3.3 mole % $GaF_3$, 3.3 mole % $ZnF_2$ and 3.3 mole % $ZrF_4$. The container was rotated to uniformly distribute the cladding glass about its inner surface, the glass was cooled, and the resultant tube was removed from the container. A core glass batch comprising 50 mole % $SnF_2$, 5 mole % SnO, 40 mole % $\frac{1}{2}(P_2O_5)$ and 5 mole % TlF was melted at 450° C. and cooled to 300° C. Rhodamine 6G was introduced into the glass which was then mixed to obtain a uniform solution. The introduction of aromatic organic compounds into tin-phosphorus oxyfluoride glass is disclosed in U.S. Pat. No. 4,379,070 which is incorporated by reference. The core melt was then poured into a cylindrical container and cooled. The resultant rod was placed in the cladding glass tube to form a rod-in-tube preform about 10 cm long and 1 cm in diameter.

The diameter of upper chamber 11 was 3 cm, and its height was 4 cm. The diameter of lower chamber 12 was 1.5 cm, and its height was 9 cm. Chambers 11 and 12, rod 14 and support 19 were formed of stainless steel. O-ring 16 was formed of neoprene rubber. Epoxy was used to bond an end of the preform to support 19 and to bond hook 34 to the opposite preform end. Rod 14 was inserted through seal 16 and threaded to means for vertically moving the rod. A wire 32, which was wound upon reel 33, was secured to the hook. Room temperature mercury was poured into chambers 11 and 12 and over the preform. Heating coil 22 was activated, whereby that portion of mercury 21 within chamber 11 was heated to 150° C. Water was flowed through cooling coil 23.

Reel 33 was rotated, and hook 34 was pulled upwardly. After root 29 began to form, rod 14 was moved upwardly to maintain the small diameter tip of root 29 at a distance that was estimated to be about 2–5 mm from the surface of the mercury. A fiber having an outside diameter of about 200 μm was drawn upwardly from root 29 at a rate of about 1 cm/sec.

We claim:

1. A method of drawing an elongated glass article comprising
positioning vertically under the surface of a molten metal a solid glass preform having upper and lower end regions, the temperature of that portion of said molten metal adjacent said upper end portion being sufficiently high to heat said upper end portion to drawing temperature,
pulling said upper end portion to form a tapered root, continued pulling resulting in the formation of an elongated article from the small diameter end of said tapered root, and
drawing said elongated article upwardly through the surface of said molten metal.

2. A method of drawing an elongated glass article comprising
vertically positioning in a container a solid glass preform having upper and lower end regions,
heating said preform to at least the annealing temperature thereof, thereafter,
flowing into said container a quantity of molten metal, the temperature of which is at least as high as said annealing temperature, said molten metal being sufficient in quantity to cover said preform,
heating said molten metal to provide it with a vertical temperature gradient such that said upper end region is subjected to a temperature that is higher than that of the remainder of said preform, the temperature of said upper end region being sufficiently high for drawing,
pulling said upper end portion to form a tapered root, continued pulling resulting in the formation of an elongated article from the small diameter end of said root, and
drawing said elongated article upwardly through the surface of said molten metal.

3. A method in accordance with claim 1 wherein the step of heating said upper end comprises heating said upper end to a temperature sufficient to melt said upper end portion.

4. A method in accordance with claim 1 wherein the step disposing further comprises maintaining the location of said root substantially constant with respect to the surface of said molten metal.

5. Apparatus for drawing an elongated glass article from an elongated glass preform having upper and lower end regions, said apparatus comprising
a container for supporting molten metal having a density greater than that of said glass preform,
means attached to the lower end region of said preform for vertically supporting said preform in said container,
means creating a vertical temperature gradient in said molten metal, said temperature gradient being sufficient to heat the upper end region of said preform to the drawing temperature of said glass preform, and
means for pulling upwardly through the surface of said molten metal an elongated article from said glass preform, whereby the initially formed portion of said article is buoyed by said molten metal and is subjected by said molten metal to hydrostatic force.

6. A method of drawing a glass fiber comprising
flowing molten glass from an orifice disposed under the surface of a molten metal, said orifice having a circularly symmetric cross-section, the density of said molten metal being greater than that of said molten glass, the viscosity of the molten glass emanating from said orifice being sufficiently low that said fiber could not be drawn from said glass without the buoyant action of said molten metal,
drawing said fiber upwardly through the surface of said molten metal, said molten glass being controlably cooled as it is drawn upwardly through said molten metal, whereby the viscosity of said molten glass becomes sufficiently high that said fiber is self supporting, the cross-sectional area of said fiber being stabilized before said fiber reaches the surface of said metal.

7. A method in accordance with claim 6 wherein the step of disposing a glass source comprises providing a source having an axial core glass region surrounded by a cladding glass region.

8. A method in accordance with claim 6 wherein said molten glass exhibits a narrow working range and is selected from the group consisting of halides, chalcogenides, oxy-halides, lead silicates, phosphates and borates.

9. A method in accordance with claim 8 wherein said molten glass readily devitrifies, thereby requiring a short residence time at draw temperature to prevent devitrification.

10. A method in accordance with claim 6 wherein the viscosity of the molten glass flowing from said orifice is less than $10^{-5}$ poise.

11. A method in accordance with claim 6 wherein said molten metal has a vertical temperature gradient, the temperature at the surface of said metal being lower than that at said orifice.

12. Apparatus for drawing an elongated glass article comprising
   container means for supporting molten metal,
   orifice means disposed in the bottom of said container means,
   means for supplying molten glass to said orifice means, the temperature of said glass being suitable for drawing said article therefrom, said glass having a lower density than said molten metal,
   baffle means for dividing said container into a plurality of vertically spaced chambers, said baffle means containing openings that are disposed vertically above said orifice,
   heating means associated with each of said chambers for heating molten metal within that chamber, thereby creating a vertical temperature gradient in said molten metal, and
   means for pulling upwardly through the surface of said molten metal an elongated article from said glass source, whereby the initially formed portion of said article is buoyed by said molten metal and is subjected by said molten metal to hydrostatic force.

13. A method in accordance with claim 6 wherein the step of disposing a glass source comprises providing a container having heating means at the outer surface thereof, and disposing said metal in said container.

14. A method in accordance with claim 6 wherein the step of disposing a glass source comprises providing a quantity of molten metal having heating means disposed therein, and disposing said source in said molten metal.

15. Apparatus in accordance with claim 12 further comprising means for cooling a portion of said molten metal.

16. A method in accordance with claim 2 wherein, prior to the step of flowing, an inert gas is flowed into said container to purge undesirable gases therefrom.

17. Apparatus in accordance with claim 12 wherein at least a portion of said heating means is located within said chambers.

18. A method of drawing an elongated glass article comprising
   providing a container of molten metal in which is vertically situated an elongated glass preform having upper and lower end regions,
   heating said molten metal to provide a vertical temperature gradient therein, said molten metal raising the temperature of said upper end region to the draw temperature of said glass preform, and
   drawing upwardly through the surface of said molten metal an elongated article from said upper end of said preform.

19. A method in accordance with claim 18 wherein the step of drawing comprises pulling said upper end portion to form a tapered root, continued pulling resulting in the formation of an elongated article from the small diameter end of said tapered root.

20. A method in accordance with claim 19 wherein the step drawing further comprises maintaining the location of said root substantially constant with respect to the surface of said molten metal.

21. A method in accordance with claim 20 wherein said preform has a circularly symmetric cross-section and has an axial core glass region surrounded by a cladding glass region.

22. A method in accordance with claim 18 wherein the step of providing comprises disposing said molten metal in a container, positioning said glass preform in said container, the difference between the temperature of said molten metal and that of said preform being sufficiently small to prevent thermally shocking said preform, and heating at least a portion of said container.

23. A method in accordance with claim 22 wherein the step of providing further comprises cooling a portion of said container.

24. A method in accordance with claim 18 wherein the step of providing comprises vertically positioning said solid glass preform in said container, heating said preform to at least the annealing temperature thereof, thereafter, flowing into said container a quantity of molten metal, the temperature of which is at least as high as said annealing temperature, said molten metal being sufficient in quantity to cover said preform, heating said molten metal to provide it with a vertical temperature gradient such that said upper end region is subjected to a temperature that is higher than that of the remainder of said preform, and pulling said upper end region to form a tapered root, continued pulling resulting in the formation of an elongated article from the small diameter end of said root.

25. A method of drawing an elongated glass article comprising
   providing a container of molten metal in which is situated an elongated glass preform having upper and lower end regions,
   heating a given region of said molten metal to the draw temperature of said glass preform,
   positioning said preform vertically in said container such that said upper end region is located in said given region, thereby raising the temperature of said upper end region to the draw temperature thereof, and
   drawing upwardly through the surface of said molten metal an elongated article from said upper end region.

26. Apparatus in accordance with claim 5 wherein said container means further comprises a source of molten metal, means for delivering molten metal from said source to said container, and means for controlling the flow of molten metal through said delivering means.

27. Apparatus in accordance with claim 5 wherein said means for vertically supporting said preform comprises a support extending through the bottom of said container.

28. Apparatus in accordance with claim 5 wherein said means for vertically supporting said preform comprises a support extending through the surface of said molten metal.

* * * * *